Nov. 30, 1965

W. F. BISLEY ETAL 3,221,140

HINGED MOUNTING FOR ELECTRIC HEATING ELEMENT

Filed Feb. 9, 1962

Inventors:
William F. Bisley
Joseph J. Jasionowski
By: Hofgren, Brady, Wegner,
Allen & Stellman
Attorneys

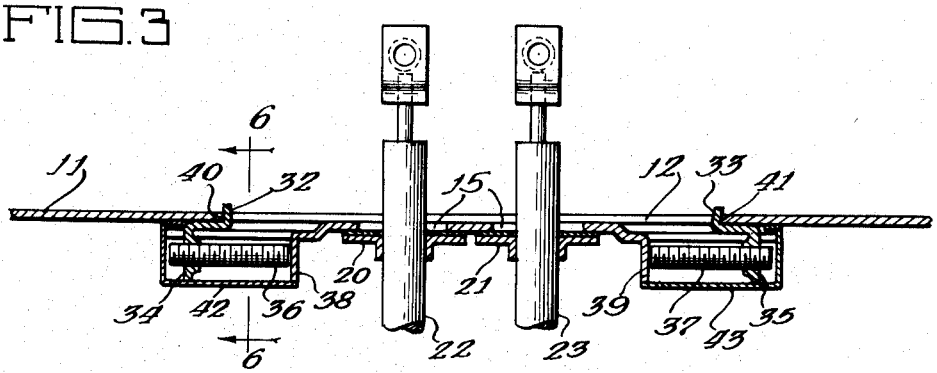
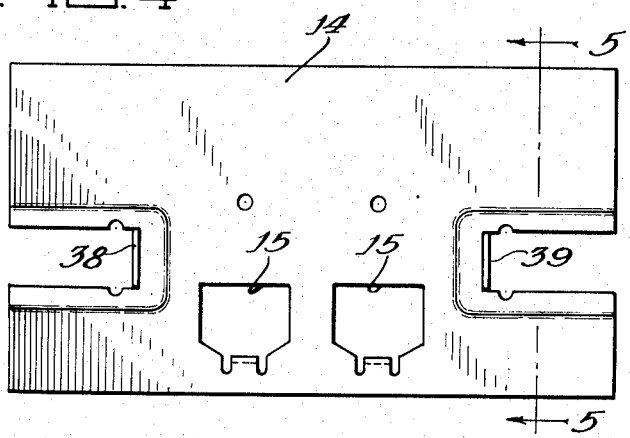
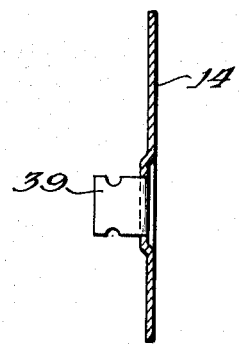
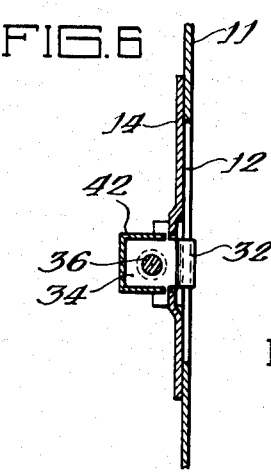
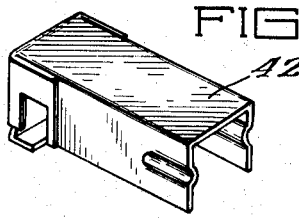
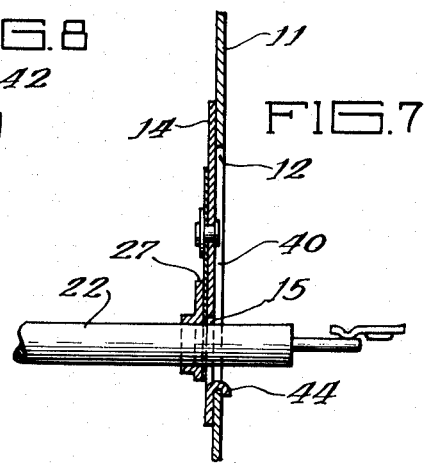
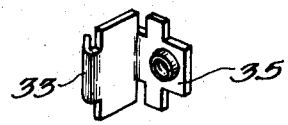

United States Patent Office 3,221,140
Patented Nov. 30, 1965

3,221,140
HINGED MOUNTING FOR ELECTRIC
HEATING ELEMENT
William F. Bisley, Elmhurst, and Joseph J. Jasionowski, Niles, Ill., assignors to Ferro Corporation, a corporation of Ohio
Filed Feb. 9, 1962, Ser. No. 172,210
1 Claim. (Cl. 219—404)

This invention relates to an electric heating element and more particularly to a mounting for an electric heating element.

It is the general object of the present invention to produce a mounting particularly adapted for use in combination with a sheathed electric heating element.

It is a more specific object of the present invention to provide a swingable or hinged mounting for an electric heating element so that the same may be pivoted to a non-interfering position when the enclosure in which the unit is housed is to be cleaned or otherwise treated.

Yet another object of the invention is to provide a mounting for an electric heating element designed to adapt the heating element for installation in an oven or the like as a replacement heating element for a pre-existing heater which has become unusable.

Other and further objects of the present invention will be readily apparent from the following disclosure and drawings, in which:

FIG. 3 is a sectional view taken along line 3—3 of FIG. 2;

FIG. 4 is a view like FIG. 2 with certain of the parts removed;

FIG. 5 is a sectional view along line 5—5 of FIG. 4;

FIG. 6 is a sectional view along line 6—6 of FIG. 3;

FIG. 7 is a sectional view along line 7—7 of FIG. 2;

FIG. 8 is a perspective view of one of the covers utilized in the construction; and FIG. 9 is a perspective view of one of the aperture-engaging fingers included within the present invention.

Figure 1:
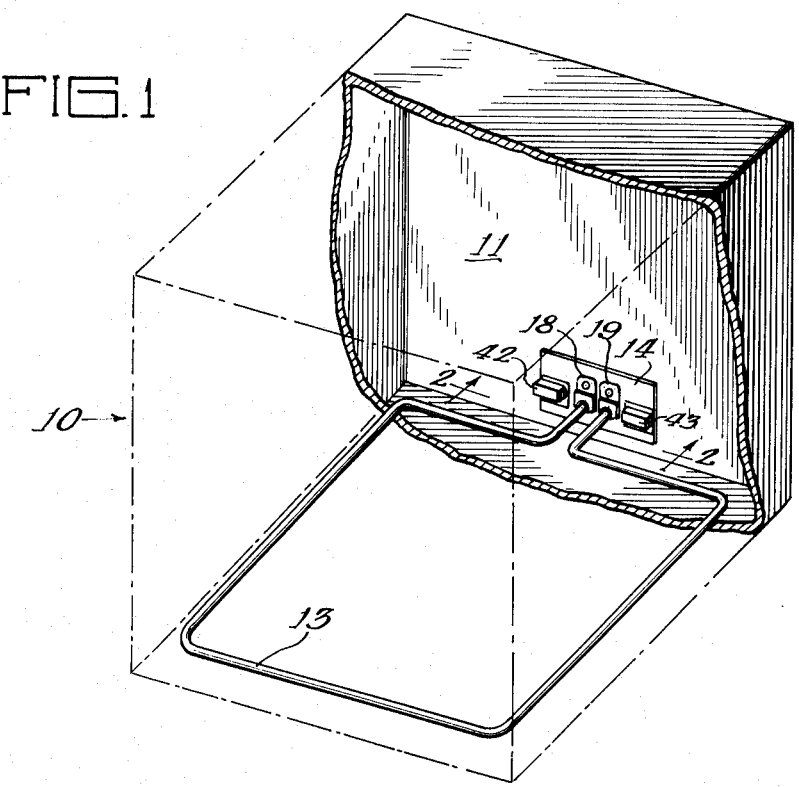
FIG. 1 is a perspective view partly broken away of an oven equipped with a mounting for a heating element in accordance with the present invention.
Figure 2:
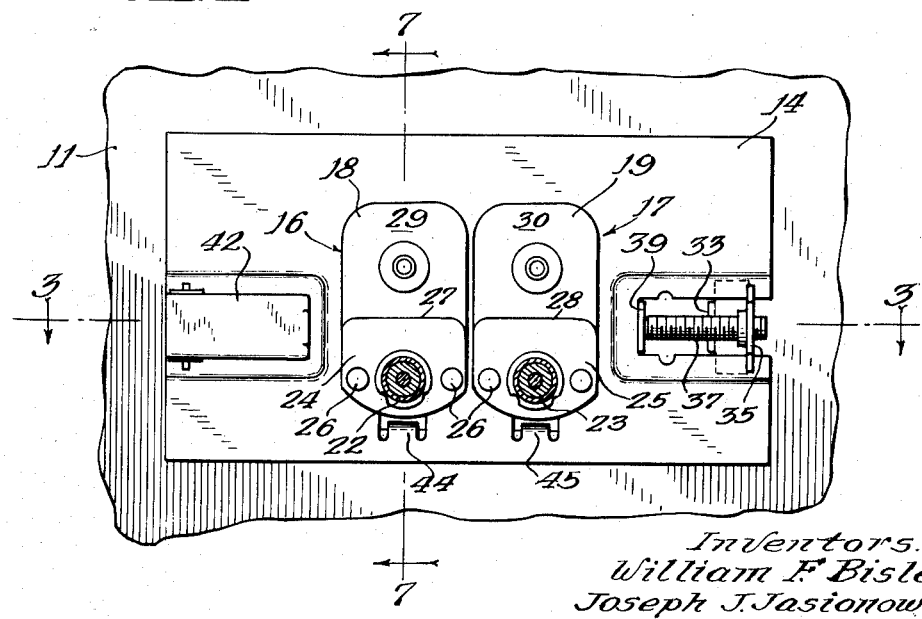
FIG. 2 is an enlarged plan view of the mounting plate or base of the present invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Present forms of construction not uncommonly include so-called "built-in" appliances and the like including electric cooking stoves and ovens. While such construction adds to the efficiency of the kitchen in which they are installed and often improves the decor thereof, the fact that an oven may be built into the wall renders the replacement of the electric heating elements used therein somewhat difficult. Inasmuch as the terminal connections to the source of electrical power are normally located back of the rear wall of the oven and the mounting means for the electric heating element may be similarly positioned, it has been the common practice to remove the oven as a necessary step in the replacement of the heating element.

According to the present invention, however, there is provided a mounting for a replacement electric heating element which enables the element to be installed without the necessity of removing the oven and which possesses a degree of universality of use which renders it suitable as a replacement item in most, if not all, of the models of ovens presently manufactured.

The present invention provides a mounting base or plate having thereon a pair of fingers movable in opposite directions to engage the sides of the aperture normally found in the rear wall of the oven, such engagement serving to hold the plate in position over the aperture. The invention also includes a novel hinge means in the form of metal straps supporting the heating element in position on the mounting plate. Thus, the replacement of a worn or damaged heating element is rendered comparatively simple and inexpensive.

Referring now to the specific embodiment of the invention shown in the drawings, there is shown in FIG. 1 an oven 10 having a rear wall 11 provided with an aperture 12 therein which formed a part of the installation of the original heating element. Within the oven 10 there is shown a replacement sheathed heating element 13 mounted upon a base 14 provided with an opening 15 overlying the aperture 12 in the rear wall of the oven.

A novel hinge construction is provided for supporting the heating element in position on the base, the construction including a pair of flexible metal straps 16 and 17, each secured at one end 18 and 19 to the base and overlying the opening 15 therein. The other ends 20 and 21 of the straps are free. If desired, of course, the metal straps 16 and 17 could be made out of a single piece of flexible metal rather than the two pieces shown. The ends 22 and 23 of the heating element are located adjacent each other as shown and provided with the usual terminals for connection to a source of electrical power. Each of the ends 22 and 23 carry a plate 24 and 25 with the plates being secured adjacent the lower edge thereof to the free ends 20 and 21 of the straps as by means of rivets 26. The upper edges 27 and 28 of the plates are free to contact the intermediate portions 29 and 30 of the straps. Thus, as the heating element 13 is pivoted upwardly from the position shown in FIG. 1, the upper edges 27 and 28 of the plates contact the intermediate portions 29 and 30 of the straps causing the latter to bend but along a relatively long radius. The construction provided by the foregoing is one which will have a comparatively long life and yet permits the heating element to be swung out of the way when cleaning the oven.

As previously indicated, the base 14 carries means for securing it in position to the rear wall and overlying the aperture 12 therein and to this end there is provided a pair of oppositely facing fingers 32 and 33, each bent at right angles as shown in FIG. 9, to provide a nut portion 34 and 35 on each finger, with the nuts being engageable with and carried by screws 36 and 37 rotatably mounted on the base. To this end, upstruck portions 38 and 39 are provided on the base which rotatably support the screws just mentioned.

In operation, the screws 36 and 37 may be rotated to move the fingers 32 and 33 inwardly to a position where the distance between the fingers is less than the width of the aperture 12. The terminals of the heating element may be connected to the wiring provided and then the base 14 is positioned over the opening. With the base so positioned, the screws 36 and 37 may be rotated to move the fingers outwardly until they engage the sides 40 and 41 of the aperture 12. Further tightening of the screws provides a holding pressure to hold the base in position on the rear wall of the oven. If desired, a snap-on cover 42, such as the one shown in FIG. 8, may be utilized and snapped into position over the screws to prevent grease and the like from contaminating the screws or entering the space back of the rear wall. A cover 42 or 43 is provide for each of the screws and may be made of appropriate size in order to cover as much or all of the screw as may be indicated. If desired, in order to further assure the security of the mounting of the base on the rear wall, lips 44 and 45 may be outstruck therefrom and positioned to overlie the lower edge of the aperture.

We claim:

The combination of an electric heater and means providing a swingable mounting therefor comprising a horizontally arranged sheathed electric heating element having an end portion, a vertical plate secured to said end portion, a base, a vertically extending flexible metal strap having its upper end secured to the base with the lower end of said strap being free of said base, and means securing the plate adjacent the lower edge thereof to said lower end of the strap with the upper edge of the plate being adapted to contact the strap intermediate the ends thereof on pivotal movement of said element whereby the bending of the strap with such pivotal movement is along a relatively long radius to reduce metal fatigue.

References Cited by the Examiner

UNITED STATES PATENTS

| | | | |
|---|---|---|---|
| 2,918,560 | 12/1959 | Kruse | 219—404 |
| 2,933,165 | 4/1960 | Rose | 248—226 |
| 2,955,189 | 10/1960 | Fry | 219—463 |
| 3,024,346 | 3/1962 | Sand | 219—404 |
| 3,154,669 | 10/1964 | Binder | 219—404 |

RICHARD M. WOOD, *Primary Examiner.*